United States Patent [19]

Howard

[11] 4,327,808
[45] May 4, 1982

[54] AERODYNAMIC PROPELLER-DRIVEN LAND VEHICLE

[76] Inventor: H. Gordon Howard, 2470 S. Ivanhoe Pl., Holly Hills, Denver, Colo. 80222

[21] Appl. No.: 50,063

[22] Filed: Jun. 19, 1979

[51] Int. Cl.³ .............................................. B62D 57/04
[52] U.S. Cl. .................................... 180/7 P; 180/165
[58] Field of Search .......... 180/7 P, 2 A, 165, 65 DD

[56] References Cited

U.S. PATENT DOCUMENTS

| | | | |
|---|---|---|---|
| 906,123 | 12/1908 | Elkin | 180/7 P |
| 1,999,296 | 4/1935 | Juergens | 180/7 P |
| 2,021,784 | 11/1935 | Hochstadt | 180/7 P |
| 2,705,935 | 4/1955 | Peterson | 180/7 P |
| 3,480,289 | 11/1969 | Larkin | 180/7 P |

*Primary Examiner*—Joseph F. Peters, Jr.
*Assistant Examiner*—Donn McGiehan

[57] ABSTRACT

A land motor vehicle having aerodynamic propellers at the anterior and posterior ends for providing aerodynamic propulsion. The propellers are attached for rotation with a drive shaft which extends longitudinally of the vehicle and which is powered by an engine through a clutch and transmission.

2 Claims, 1 Drawing Figure

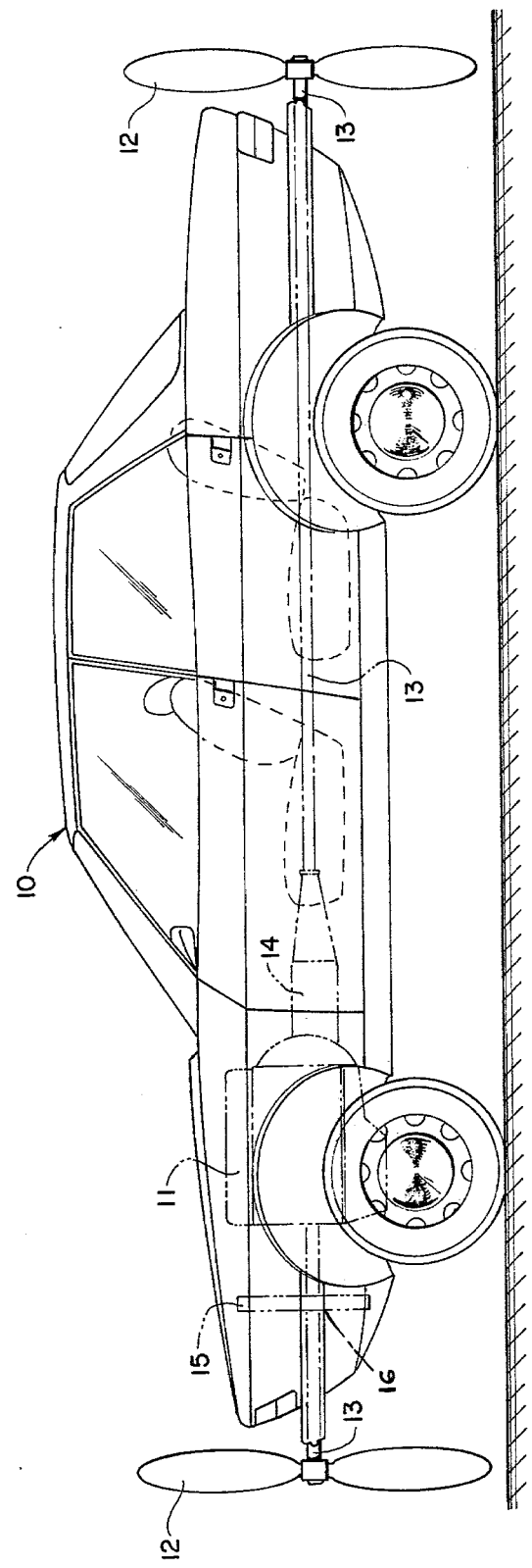

AERODYNAMIC PROPELLER-DRIVEN LAND VEHICLE

BACKGROUND OF THE INVENTION

This invention relates to land motor vehicles and more particularly to an aerodynamic propeller driven land motor vehicle. This motor vehicle uses for propulsion the principles of aerodynamics wherein thrust is obtained from engine-driven propellers mounted beyond the anterior or posterior of a conventional automobile.

Prior art motor vehicles, particularly the conventional automobile, are propelled by applying power from an engine to ground engaging wheels through a drive train which typically includes a clutch, a multi-speed transmission, a drive shaft, a differential and axles connected to the wheels. The multitude of elements in the drive train and particularly the differential creates friction and inertia which reduces the power available to the driven wheels that is developed by the engine. This lack of efficiency results in high fuel energy consumption.

One approach to solve this problem of low efficiency in conventional wheel-driven motor vehicles is to eliminate the differential gearing and to substitute aerodynamic propulsion. However, most prior art attempts in propeller driven motor vehicles have not been successful because they have resulted in vehicles that are also inefficient mainly because of compromises made for the location the propeller on the vehicle, the guards for the propeller and attempts to integrate the aerodynamic propulsion system into the conventional wheel driven system of the automobile.

SUMMARY OF THE INVENTION

Briefly the instant invention overcomes the disadvantages of the prior art by providing a land motor vehicle with aerodynamic propulsion and eliminating the conventional differential gearing for driven wheels. A four-wheel land vehicle is provided with an engine which drives, through a clutch and gear change transmission, a drive shaft extending longitudinally of the vehicle. The drive shaft terminates beyond the anterior or posterior of the vehicle. Alternatively, the drive shaft may extend beyond both ends of the vehicle. An aerodynamic screw propeller is mounted on the drive shaft one at each terminus. If a water-cooled engine is used, the necessary radiator is provided with a fore to aft aperture to permit passage of the drive shaft to the anterior of the vehicle.

Accordingly, an object of the invention is to provide a new, improved propulsion system for a land motor vehicle having high efficiency and low fuel energy consumption.

Another object of the invention is to provide a land motor vehicle with aerodynamic propulsion of high efficiency and eliminating the inertia and gear friction associated with differential gearing for driven wheels.

BRIEF DESCRIPTION OF THE DRAWING

A more complete understanding of the invention and many of the attendant advantages thereto will be apparent from the following detailed description when considered in conjunction with the accompanying drawing wherein:

The FIGURE is a side elevation schematic view of the aerodynamically propelled land vehicle according to the invention.

DESCRIPTION OF THE PREFERRED EMBODIMENT

Referring now to the drawing, there is shown generally in the FIGURE a preferred embodiment of my invention comprising a land vehicle 10. The vehicle may be in the form of a conventional automobile body and having four wheels as illustrated. In the forward, anterior end of the vehicle is an engine 11 which may be air-or water-cooled. A clutch and gear changing transmission 14 is connected to the rear of the engine 11 in a conventional manner well known in the art. Coupled to the clutch and transmission is a drive shaft 13 which extends longitudinally along the centerline of the vehicle. The drive shaft 13 is shown extending the entire length of the vehicle 10, and terminating beyond the anterior and posterior ends. But it is to be understood that the drive shaft may extend only to the anterior or the posterior end of the vehicle.

If the engine 11 is a water-cooled type, the vehicle will be provided with a radiator 15 mounted at the anterior of the vehicle and forward of the engine. Further if the drive shaft 13 extends to the anterior of the vehicle, the radiator will be provided with a fore to aft aperture 16 therein for the passage of the drive shaft.

In the embodiment shown, an aerodynamic screw type propeller 12 is mounted for rotation with the drive shaft at each terminus of the shaft thus placing the propellers beyond the anterior and posterior ends of the vehicle. It is to be understood, however, that one propeller at either end may be used to produce propulsion of the vehicle.

The propeller driven land motor vehicle operates according to the principles of aerodynamics. The aerodynamic screw type propellers when rotated at a high rate of speed produce a flow of air which produces thrust to propel the vehicle.

The engine 11 provides power to rotate the propellers 12 through the drive shaft 13. The clutch and transmission 14 interposed between the engine and drive shaft are used in conjunction to change the gear ratio to match the performance of the engine in relation to rotation of the propellers and to engage and disengage the drive shaft for starting and stopping the propulsion system of the vehicle 10.

Increased stability of the motor vehicle can be achieved by the use of weights and counterbalances (not shown) incorporated in the vehicle body but are not necessary for safe and efficient operation.

Obviously, many modifications and variations of the present invention are possible in light of the above teachings. It is therefore to be understood that within the scope of the appended claims, the invention may be practiced otherwise than as specifically described.

What is claimed is:

1. An aerodynamic propeller driven land vehicle, comprising:
   an engine for propelling the vehicle;
   a clutch connected to the output of said engine for disengaging the output;
   a gear transmission connected to said clutch to provide a variable speed output from said engine;
   a drive shaft connected to said transmission for rotation thereby extending longitudinally of the vehicle and terminating beyond the anterior and posterior of the vehicle; and a pair of aerodynamic screw propellers mounted on said drive shaft, one at each terminus of said shaft; whereby standard differential gearing is unnecessary and any associated inertia and friction are minimized.

2. An aerodynamic propeller driven land vehicle comprising:

an engine for propelling the vehicle;

a radiator, having a fore to aft aperture therethrough, mounted at the anterior of the vehicle for cooling said engine;

a drive shaft connected to said engine for rotation thereby extending longitudinally of the vehicle through said aperture in said radiator and terminating at the anterior end of the vehicle; and a screw propeller attached to the terminus of said drive shaft;

whereby the vehicle is aerodynamically propelled without the associated friction of differential gears.

* * * * *